United States Patent [19]

Cornett et al.

[11] 4,242,864
[45] Jan. 6, 1981

[54] INTEGRATED CONTROL SYSTEM FOR A GAS TURBINE ENGINE

[75] Inventors: Jack E. Cornett; Andrew A. Saunders, Jr., both of Cincinnati; Ira E. Marvin, Fairfield; Richard S. Beitler, Cincinnati, all of Ohio

[73] Assignee: The United States of America as represented by the Administrator of the National Aeronautics and Space Administration, Washington, D.C.

[21] Appl. No.: 909,608

[22] Filed: May 25, 1978

Related U.S. Application Data

[63] Continuation-in-part of Ser. No. 741,056, Nov. 11, 1976, abandoned.

[51] Int. Cl.³ .............................................. F02K 3/06
[52] U.S. Cl. .................................. 60/226 R; 60/236; 60/238; 60/239
[58] Field of Search ......... 60/226 R, 226 A, 235–240, 60/242

[56] References Cited

U.S. PATENT DOCUMENTS

| | | | |
|---|---|---|---|
| 3,401,524 | 9/1968 | Urban | 60/239 |
| 3,797,233 | 3/1974 | Webb et al. | 60/226 R |
| 3,932,058 | 1/1976 | Harner et al. | 60/226 A |
| 4,068,469 | 1/1978 | Adamson | 60/226 R |

Primary Examiner—Robert E. Garrett
Attorney, Agent, or Firm—Carl L. Silverman; Derek P. Lawrence; Norman T. Musial

[57] ABSTRACT

An integrated control system for a gas turbine engine of the turbofan type receives signals from a plurality of engine sensors and from the engine operator and generates control signals therefrom. A first control signal regulates the fan exhaust nozzle area in order to control inlet throat Mach number to maintain a low level of engine noise. Additional control signals regulate fuel flow to control engine thrust and fan pitch to control fan speed. A plurality of schedules are utilized to maintain a predetermined relationship between the controlled parameters and a number of fixed and calculated limits can override the control signals to prevent unsatisfactory engine performance.

29 Claims, 5 Drawing Figures

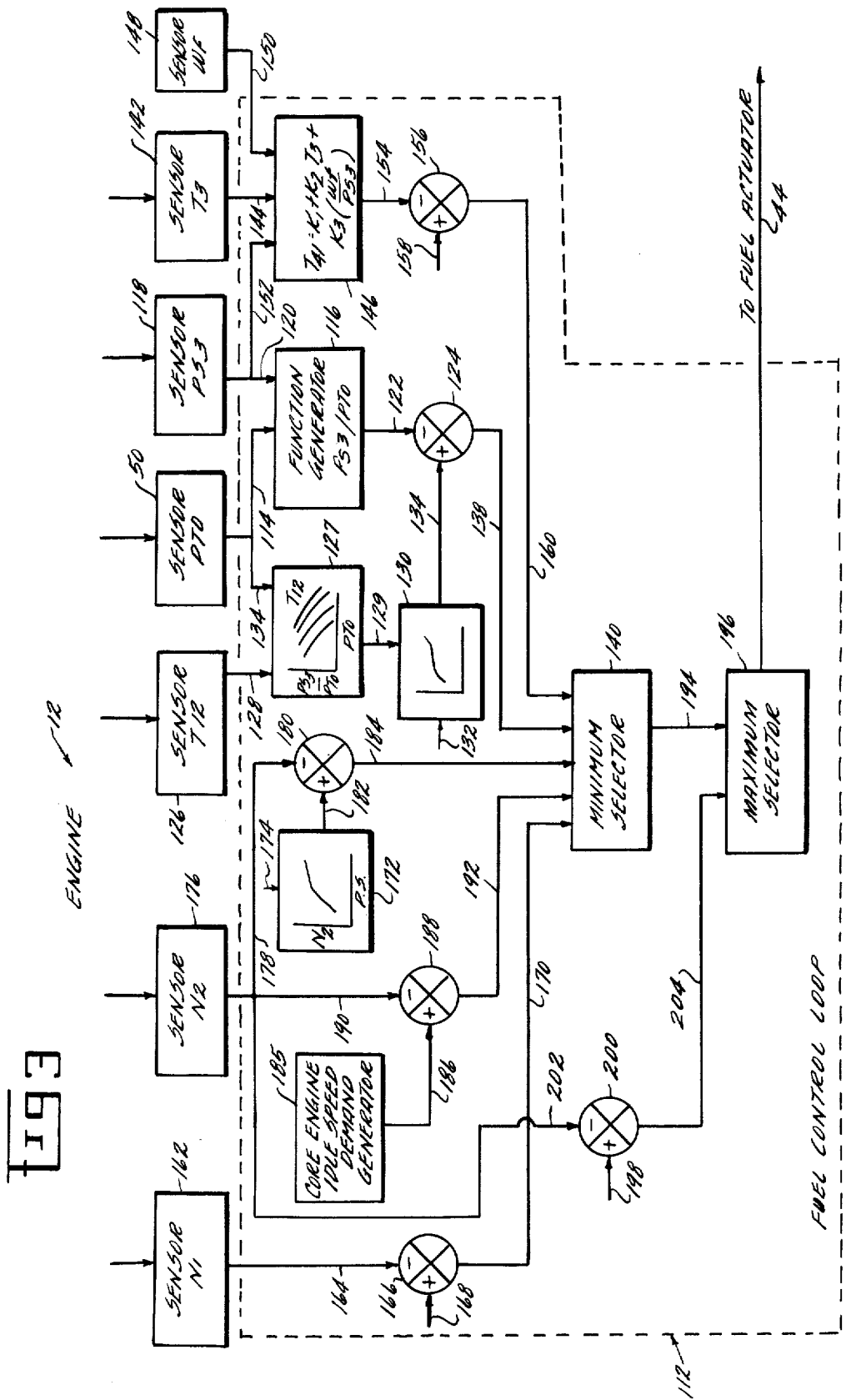

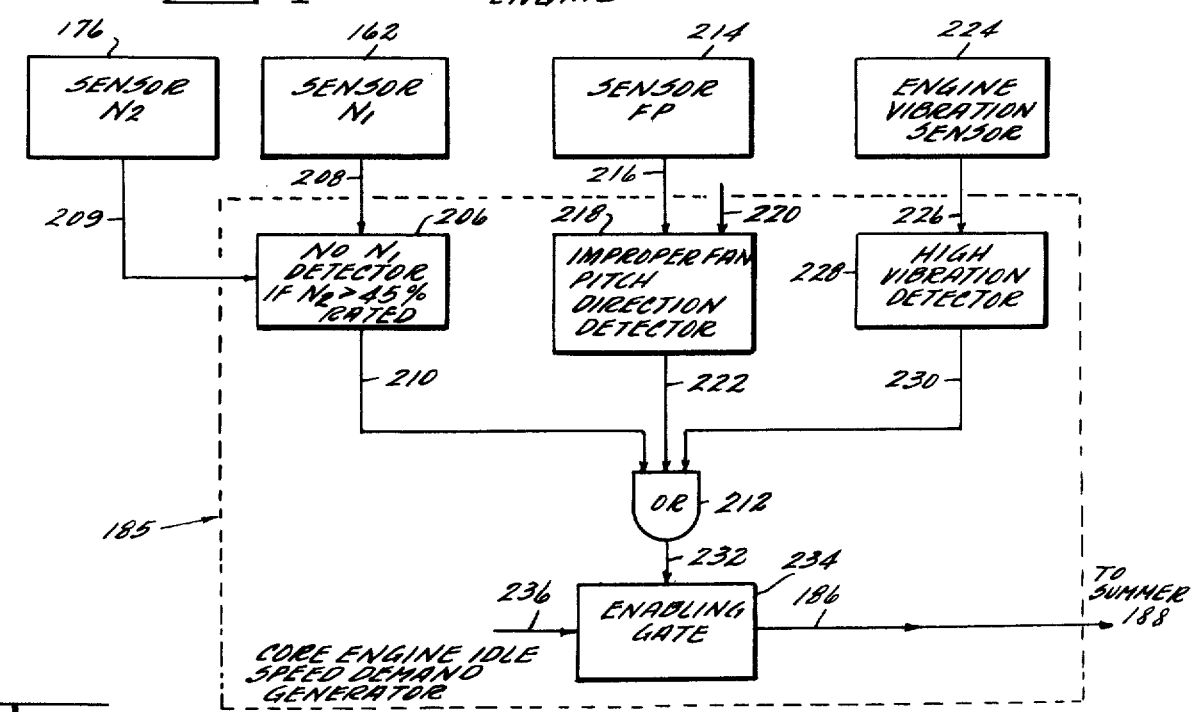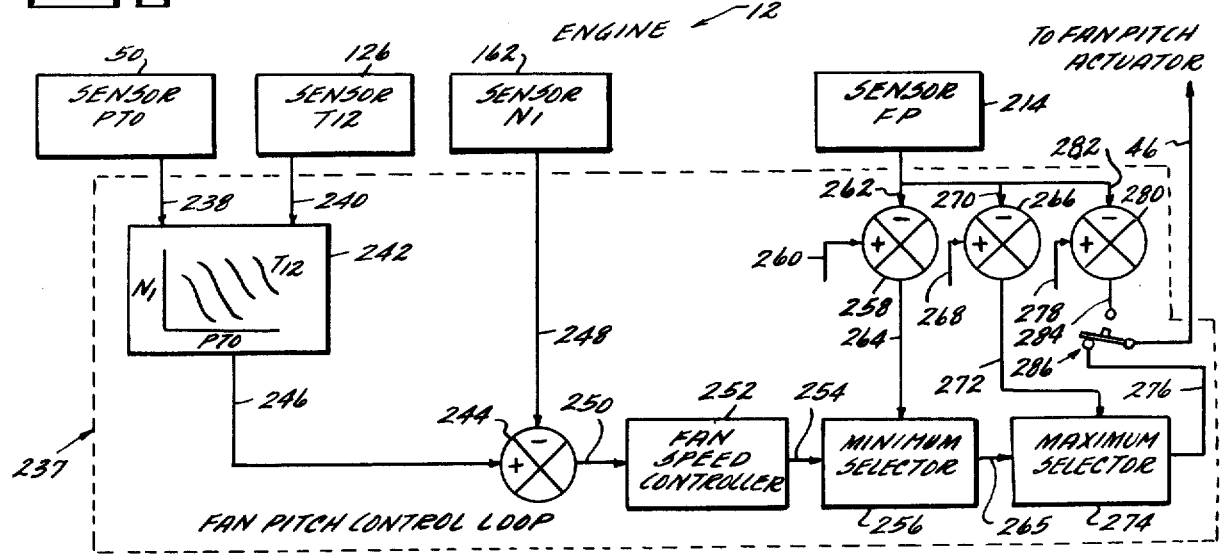

INTEGRATED CONTROL SYSTEM FOR A GAS TURBINE ENGINE

The invention herein described was made in the performance of work under a NASA contract and is subject to the provisions of the National Aeronautics and Space Act of 1958, Public Law 85-568 (72 Stat. 435; 42 U.S.C. 2457).

CROSS REFERENCE TO RELATED APPLICATION

This is a continuation-in-part of Ser. No. 741,056, filed Nov. 11, 1976, now abandoned.

BACKGROUND OF THE INVENTION

1. Field of the Invention

This invention relates generally to gas turbine engines and, more particularly, to a method and apparatus for controlling the power and minimizing the fan-radiated noise of a turbofan engine.

2. Description of the Prior Art

Prior art engine control systems have controlled engine operation primarily by regulating engine fuel flow in order to produce a desired level of thrust. Various other engine components, such as exhaust nozzles, have sometimes been manipulated by separate controls, again primarily for the purpose of regulating the thrust level. Little, if any, intercommunication has been provided between the fuel control and the controls for the various other engine components.

Present-day aircraft propulsion systems are required to operate efficiently over a wide range of engine altitudes and thrust levels while maintaining engine noise below certain maximum limits. Since prior art engine control systems were designed primarily for regulating only the engine thrust level, they do not have the inherent capability of simultaneously minimizing the engine noise.

It is therefore an object of the present invention to provide an integrated gas turbine engine control system which maintains low engine noise levels while producing desired thrust-setting accuracy and rapid thrust response.

Another object of the present invention is to provide such a control system which operates automatically.

A further object of the present invention is to provide such a control system which utilizes more fully and efficiently existing engine components.

SUMMARY OF THE INVENTION

Briefly stated, these and other objects which will hereinafter become more readily apparent are accomplished by the present invention which, in one form, provides, for a gas turbine engine of the turbofan type, an integrated control system which controls production of a desired thrust level while automatically maintaining a low engine noise level. The control system receives signals from a plurality of sensors disposed throughout the engine and from the engine operator and then generates control signals. A first control signal is employed to vary the fan exhaust nozzle area to maintain a fixed inlet throat Mach number which provides a low engine noise level. Additional control signals may also be employed to regulate fuel flow in order to control engine thrust and to manipulate fan pitch in order to control fan speed. The control system also includes a plurality of schedules which maintain a predetermined relationship between the various controlled parameters and a number of fixed and calculated limits which can override the control signals in order to prevent engine damage or unsatisfactory engine performance.

BRIEF DESCRITPION OF THE DRAWINGS

FIG. 3 is a block diagram representation of the fuel control loop portion of the present invention.

FIG. 4 is a more detailed block diagram of a portion of FIG. 3.

FIG. 5 is a block diagram of the fan pitch control loop portion of the present invention.

DESCRIPTION OF THE PREFERRED EMBODIMENT

Figure 1:
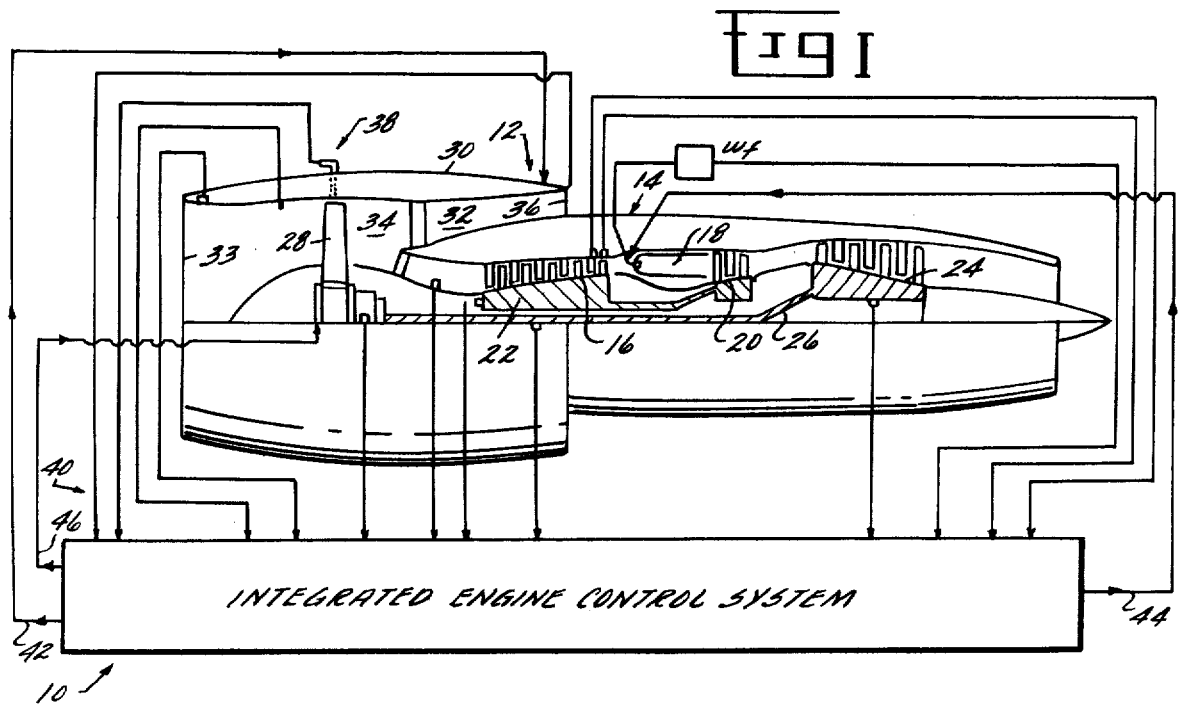
FIG. 1 is a schematic illustration of the turbofan engine to which the present invention relates.

Referring to FIG. 1, the present invention in one form is shown generally at 10 as an integrated control system for a turbofan engine 12. The turbofan engine 12 comprises a core engine 14 which includes, in serial flow relationship, a compressor 16, a combustor 18 and a high pressure turbine 20. The high pressure turbine 20 is drivingly connected to the compressor 16 by a core rotor 22. The engine 12 also comprises a low pressure system which includes a low pressure turbine 24 which is drivingly connected by a low pressure shaft 26 to a fan 28, preferably of the variable pitch type. A wall such as an outer nacelle 30 is spaced apart from the core engine 14 to define a bypass duct 32 therebetween and a forward fan inlet 33. The forward portion of the bypass duct 32 defines an inlet 34 for receiving bypass air from the fan 28. The aft portion of the bypass duct 32 defines a variable area fan exhaust nozzle 36 through which fan bypass air is exhausted. A detailed description of the operation of the engine 12 is believed to be unnecessary for purposes of describing the present invention.

As shown in FIG. 1, the integrated control system 10 receives signals from a plurality of engine sensors shown generally as 38 over a plurality of conducting means, hereinafter called "lines" and shown generally as 40. Individual sensors 38 may be of any well-known type which provides an appropriate indication of the particular engine parameter being measured. A more detailed description of the particular engine parameters which are being measured by the sensors 38 is presented below.

The integrated control system 10 also transmits control signals along three output lines 42, 44 and 46 to actuator means (not shown) which in turn respectively alter the fan exhaust nozzle area, fuel flow and fan pitch in response to the control signals. A more detailed description of the control signals and their functions is presented below.

The integrated control system 10, which is preferably of the digital electronic type, has been presented in three individual control loops in order to more clearly explain its structure and operation. Although this embodiment of the present invention employs three interrelated control loops to control three different parameters, it will be obvious to one skilled in the art that a greater or lesser number of such control loops could be employed if desired to control additional or fewer parameters.

Figure 2:
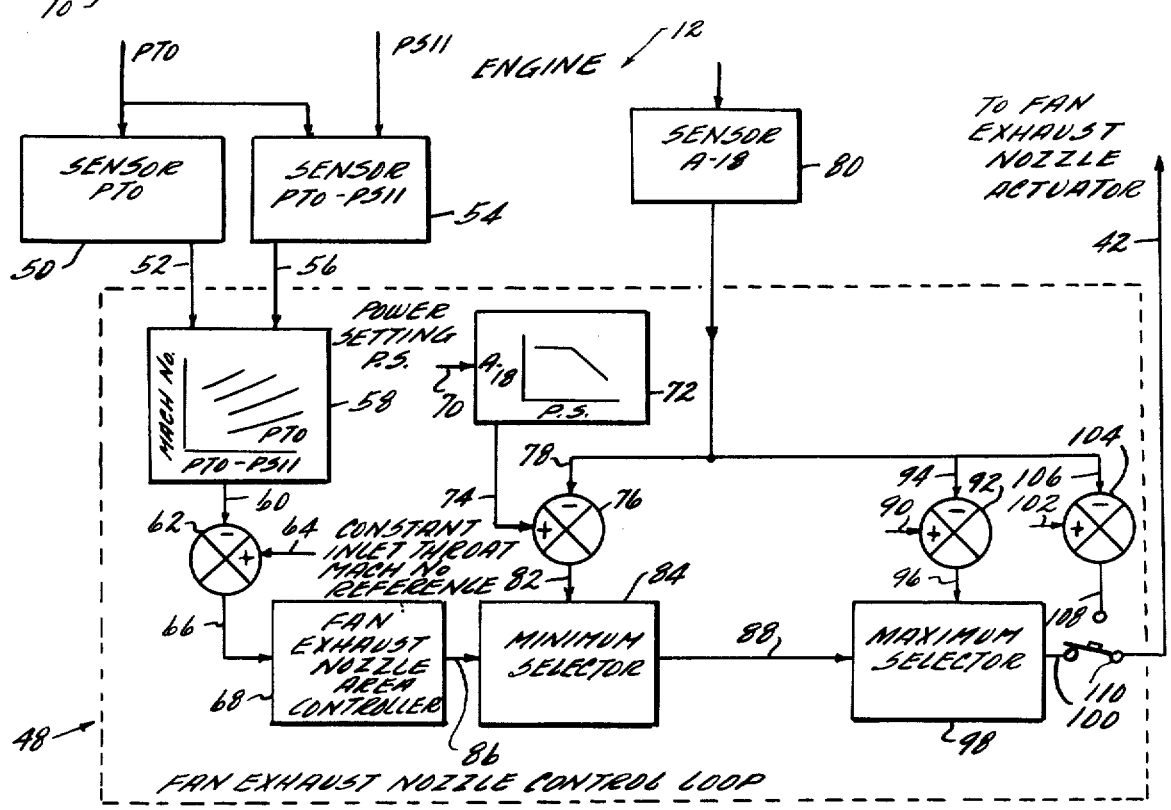
FIG. 2 is a block diagram of the fan exhaust nozzle area control loop portion of the present invention.

Referring now to FIG. 2, there is shown a block diagram of the fan exhaust nozzle control loop shown generally as 48 of the integrated control system 10. The fan exhaust nozzle control loop 48 operates to vary the area of the fan exhaust nozzle in order to maintain a constant Mach number at the throat of inlet 33. An intermediate reference value of the inlet throat Mach number is selected as a compromise between the high level desired for best inlet noise reduction and the low level desired for best inlet performance.

The actual inlet throat Mach number is calculated from free stream total pressure and inlet throat static pressure. The free stream total pressure (PTO) is determined by a sensor 50 and the representative signal is passed into the fan exhaust nozzle control loop 48 by line 52. The difference between PTO and the inlet static pressure (PTO-PS11) is determined by a differential pressure sensor 54 and the representative signal is passed along line 56 into the fan exhaust control loop 48. A nonlinear function generator 58 receives the PTO and the PTO-PS11 signals along lines 52 and 56 respectively and generates a signal representative of the actual inlet throat Mach number which is transmitted along line 60 to a summer 62.

The summer 62 compares the inlet throat Mach number signal received along line 60 with a signal representative of the constant inlet throat Mach number reference value which is received along line 64. A resultant inlet throat Mach number difference signal is passed along line 68 to a fan exhaust nozzle area controller 68.

The fan exhaust nozzle area controller 68 generates a fan exhaust nozzle area change signal which is proportional to the inlet throat Mach number difference signal received over line 66. During normal steady-state engine operation, the actual fan exhaust nozzle area is varied in response to the change signal exactly as generated by the fan exhaust nozzle area controller 68. However, since the engine does not always operate in a normal steady-state condition, a number of limits (as discussed in detail below) are incorporated to restrict the extent of the actual change of the exhaust nozzle area in order to prevent engine damage or unsatisfactory engine operation.

In order to improve transient response and prevent excessive fan exhaust nozzle area in the event of certain failures, an indication of the aircraft power setting is supplied along line 70 to a nonlinear function generator 72 which generates a signal representative of a maximum allowable fan exhaust nozzle area for a particular power setting. The power setting indication may be in the form of an electrical signal supplied either by the engine operator or by an aircraft flight control computer. The fan exhaust nozzle maximum area limit signal from the function generator 72 is transmitted along line 74 to a summer 76. Summer 76 compares the fan exhaust nozzle maximum area limit signal with a signal representative of the actual fan exhaust nozzle area received along line 78 from a fan exhaust nozzle area (A18) sensor 80. The resultant error signal is transmitted along line 82 to a minimum selector 84.

The minimum selector 84 receives both the fan exhaust nozzle maximum area limit error signal along line 82 and the fan exhaust nozzle area change signal along line 86 and outputs only the most negative of the two signals along line 88. The result is that any change which is made to the fan exhaust nozzle is limited so as to prevent the fan exhaust nozzle area from exceeding the maximum limit which is imposed by the current power setting.

The fan exhaust nozzle area change signal generated by the fan exhaust nozzle area controller 68 is also subject to a minimum limit. A fixed minimum area limit signal representative of the smallest fan exhaust nozzle area which may be maintained without risking a deterioration in engine performance or possible engine damage is transmitted to a summer 92 along line 90. The summer 92 also receives a signal representative of the actual fan exhaust nozzle area (A18) from sensor 80 along line 94. The summer 92 compares the two signals and the resultant fan nozzle minimum area limit error signal is transmitted along line 96 to a maximum selector 98. The maximum selector 98 receives both the output signal from the minimum selector 84 and the fan exhaust minimum area limit error signal from summer 92 and outputs only the most positive of the two signals along line 100. The result is that any change which is made to the fan exhaust nozzle is also limited so as to prevent the fan exhaust nozzle area from becoming smaller than the fixed minimum area limit.

As long as the variable pitch fan 28 is operating in a forward thrust mode, the fan exhaust nozzle area is controlled as described above with the output signal from the maximum selector being transmitted along lines 100 and 42 to a fan exhaust nozzle actuator (not shown). The fan exhaust nozzle actuator may be of the electromechanical type or of any other well-known type which physically adjusts the area of the fan exhaust nozzle in response to the received electrical signals.

When the fan 28 is operating in a reverse thrust mode, it is desirable to maintain the fan exhaust nozzle at a fixed area. In order to maintain the fixed reverse thrust nozzle area, a reverse thrust demand signal representative of the fixed reverse fan exhaust nozzle area is transmitted along line 102 to a summer 104. Summer 104 compares the received reverse demand signal with a signal representative of the actual fan exhaust nozzle area received along line 106 from sensor 80. The resultant reverse fan exhaust nozzle area error signal is placed on line 108.

A switch 110 operates in response to the engine operator's selecting a reverse thrust mode of fan operation to break the connection between line 100 and line 42, thereby preventing the output signal from the maximum selector 98 from being transmitted to the fan exhaust nozzle transmitting only the reverse fan exhaust nozzle area error signal from summer 104 to the fan exhaust nozzle actuator in order to maintain the fan exhaust nozzle at the desired fixed reverse thrust area.

Referring now to FIG. 3 there is shown a block diagram of the fuel control loop 112 of the integrated control system 10. The fuel control loop 112 operates to control the flow of fuel in order to maintain a desired thrust level which is set by the engine operator. This is accomplished by comparing the actual thrust with the desired thrust and adjusting the fuel flow in accordance with the comparison.

The actual thrust is calculated as a function of the ratio of the compressor discharge static pressure to the free stream total pressure. A signal representative of the free stream total pressure (PTO) is passed along line 114 from the sensor 50 to a function generator 116. The compressor discharge static pressure (PS3) is determined by a sensor 118, and a representative signal is passed to the function generator 116 along line 120. The function generator 116 receives the PTO and PS3 signals and generates a signal which is representative of the actual thrust. This generated thrust signal is transmitted along line 122 to a summer 124.

The desired thrust is calculated as a function of the free stream total pressure, the fan inlet temperature and the engine operator power setting. The fan inlet temperature (T12) is determined by a sensor 126 and a representative signal is passed to a function generator 127 along line 128. The function generator 127 also receives a signal indicative of the free stream total pressure from sensor 50 along line 134 and generates a signal representative of a maximum PS3/PTO ratio which is transmitted along line 129 to another function generator 130. The function generator 130 receives a signal indicative of the power setting along line 132 and the output signal from function generator 127 and generates a signal representative of the desired thrust which is then transmitted along line 134 to summer 124.

The summer 124 compares the actual thrust signal received from the function generator 116 with the desired thrust signal received from the function generator 130 and the resultant thrust difference signal is transmitted along line 138 to a minimum selector 140.

During normal steady-state engine operation, the fuel would be regulated only in response to the thrust difference signal. However, since the engine does not always operate under normal steady-state conditions a number of limits (as discussed in detail below) are incorporated to restrict the effect that the thrust difference signal actually has upon the fuel flow in order to prevent engine damage or unsatisifactory engine operation. All of the maximum limits are determined and transmitted to the minimum selector 140.

The first maximum limit relates to keeping the turbine inlet gas temperature (T41) below a fixed maximum limit. The compressor discharge temperature (T3) is determined by a sensor 142 and a representative signal is passed via line 144 to a function generator 146. The fuel flow (Wf) is determined by a sensor 148 and is also transmitted to the function generator 146 along line 150. A signal representative of the compressor discharge static pressure (PS3) is also transmitted to function generator 146 from sensor 118 via line 152. The function generator 146 generates a signal representative of the actual turbine inlet gas temperature (T41) which is transmitted along line 154 to a summer 156. Summer 156 compares the received turbine inlet gas temperature (T41) signal with a signal representative of a predetermined fixed maximum turbine inlet gas temperature limit which is received along line 158. The resultant maximum turbine inlet gas temperature error signal is transmitted to the minimum selector 140 along line 160.

The second maximum limit relates to maintaining the fan speed (N1) below a fixed maximum limit. The fan speed (N1) is determined by a sensor 162 and a representative signal is passed along line 164 to a summer 166. The summer 166 compares the received fan speed (N1) signal with a signal representative of a predetermined fixed maximum fan speed limit which is received via line 168. The resultant maximum fan speed error signal is transmitted to the minimum selector 140 along line 170.

The third maximum limit relates to maintaining the core engine speed (N2) below a maximum limit which is determined as a function of the engine operator power setting. A nonlinear function generator 172 generates, as a function of the power setting signal received along line 174, a signal representative of a maximum core engine speed. The actual core engine speed (N2) is determined by a sensor 176 which transmits a representative signal along line 178 to a summer 180. The summer then compares the actual core engine speed signal (N2) with the maximum core engine speed signal as received along line 182 to generate a maximum core engine speed error signal which is transmitted by line 184 to the minimum selector 140.

The fourth maximum limit relates to maintaining the core engine rotation at a fixed idle speed if a core engine idle speed demand signal is generated. As will be described in greater detail below, a core engine idle speed demand signal is generated by idle speed demand generator 185, when any of the following three conditions has occurred: no fan speed is detected when core engine speed is above 45% of rated speed; fan pitch is improper for the mode of fan operation; or high engine vibration is detected. If a core engine idle speed demand signal is generated, it is transmitted along line 186 to a summer 188. Summer 188 then compares the core engine idle speed demand signal with an actual core engine speed signal receive along line 190 from sensor 176 to generate a core engine idle speed demand error signal which is transmitted to the minimum selector 140 along line 192.

The minimum selector 140 receives the thrust difference signal from summer 124 and the four above-described maximum limit signals and outputs only the most negative of the five signals along line 194 to a maximum selector 196. This has the effect of insuring that the thrust difference signal is only selected if it is less than any of the above-described maximum limits.

In addition to the four maximum limits which restrict the thrust difference signal from acting to overly increase the fuel flow, there is a limit, related to maintaining the core engine idle speed above a fixed minimum limit, which restricts the thrust difference from overly decreasing the fuel flow. A signal representative of a core engine minimum idle speed limit is transmitted along line 198 to a summer 200. The summer 200 compares the minimum core engine idle speed limit signal with a signal representative of the actual core engine (N2) which is received from sensor 176 along line 202. The resultant core engine minimum idle speed error signal is transmitted along line 204 to the maximum selector 196.

The maximum selector 196 receives the core engine minimum idle speed signal and the output signal from the minimum selector 140 and outputs only the most positive of the two signals along line 44 to a hydromechanical actuator (not shown). The hydromechanical actuator may be of any well-known type which receives an electrical signal and converts it to an adjustment in the fuel flow. In addition, the actuator may contain additional limits, for example an acceleration schedule or a deceleration schedule, which may further restrict changes in the fuel flow.

Referring now to FIG. 4, there is shown a block diagram of the core engine idle speed demand generator 185. A detector 206 is connected by line 208 to the fan speed sensor 162 and by line 209 to the core engine speed sensor 176. The detector 206 operates to generate an output signal only if the engine speed exceeds 45% of rated speed and no fan speed signal is present. Any output signal from the detector 206 is transmitted along line 210 to a first input of an OR-gate 212.

The pitch of the fan 28 is determined by a sensor 214 and a representative signal is passed by line 216 to a second detector 218. Detector 218 receives along line 220 a signal which is indicative of the fan operating thrust mode, in addition to the fan pitch signal, and generates an output signal only if the fan pitch is improper for the selected thrust mode of fan operation. Thus, if the engine operator has selected a reverse thrust mode of fan operation and the fan pitch is indicated as being in the forward thrust region, detector 218 generates an output signal, which is passed to a second input of the OR-gate 212 along line 222. Likewise, if the engine operator has selected a forward thrust mode of fan operation and the fan pitch is indicated as being in the reverse region, an output signal will also be generated by the detector 218.

Engine vibration is determined by a sensor 224 and a representative signal is passed along line 226 to a third detector 228. Detector 228 operates to generate an output signal only when engine vibration exceeds a fixed limit. Any output signal from the detector 228 is transmitted along line 230 to a third input of OR-gate 212.

If OR-gate 212 receives a signal at any of its three inputs, it passes the signal along line 232 to an enabling gate 234. The enabling gate 234 constantly receives a signal representative of a fixed core engine idle speed along line 236. If the enabling gate 234 receives a signal from the OR-gate 212, it creates a core engine idle speed demand by passing the fixed core engine idle speed signal along line 186 to the summer 188.

Referring now to FIG. 5, there is shown a block diagram of the fan pitch control loop 237 of control system 10. The fan pitch control loop operates to manipulate the fan pitch in order to maintain fan speed at a rated value, which is constant under most operating conditions. This is done primarily to provide rapid response from low to high thrust by eliminating the need to accelerate the fan rotor. Fan pitch manipulation is accomplished by comparing the actual fan speed with a calculated desired fan speed and adjusting the fan pitch in accordance with the comparison.

The desired fan speed is calculated as a function of the free stream total pressure (PTO) and the fan inlet temperature (T12). Signals representative of PTO and T12 are passed from sensors 50 and 126, respectively, along lines 238 and 240 to a nonlinear function generator 242. Function generator 242 generates as a function of both the PTO and T12 signals a signal representative of the desired fan speed, which is passed to a summer 244 along line 246.

Summer 244 compares the desired fan speed signal with a signal representative of the actual fan speed which is received from sensor 162 via line 248. The resultant fan speed difference signal is passed along line 250 to a fan speed controller 252.

The fan speed controller 252 generates a fan pitch adjustment signal proportional to the received fan speed difference signal which is transmitted along line 254 to a minimum selector 256. During normal steady-state engine operation, the fan pitch is manipulated in response to the fan pitch adjustment signal exactly as generated by the fan speed controller 252. However, since the engine does not always operate under normal steady-state conditions, a number of limits (as discussed in detail below) are incorporated to restrict the actual changes made to the fan pitch in order to prevent engine damage or unsatisfactory engine performance.

A first such limit acts to prevent the fan pitch angle from exceeding a fixed maximum limit. A summer 258 compares a signal representative of a fixed maximum fan pitch angle limit, which is received along line 260, with a signal representative of the actual fan pitch angle which is received from sensor 214 along line 262. The resulting fan pitch maximum angle limit error signal is transmitted along line 264 to the minimum selector 256. The minimum selector 256 receives both the fan pitch adjustment signal and the fan pitch maximum angle limit error signal and outputs only the most negative of the two signals over line 265. The result is that any change which is made to the fan pitch is limited so as to prevent the fan pitch from exceeding the fixed maximum fan pitch angle limit.

A second limit relates to preventing the fan pitch angle from exceeding a fixed minimum limit. A summer 266 compares a signal representative of a fixed minimum fan pitch angle limit which is received along line 268 with the actual fan pitch angle signal received from sensor 214 along line 270. The resulting fan pitch minimum angle limit error signal is transmitted along line 272 to a maximum selector 274.

The maximum selector 274 receives both the fan pitch minimum angle limit error signal and the output signal from the minimum selector 256 and outputs only the most positive of the two signals along line 276. The result is that the fan pitch angle is prevented from being made any smaller than the fixed minimum fan pitch angle limit.

As long as the variable pitch fan 28 is operating in a forward thrust mode, the fan pitch is controlled essentially as described above with the output signal from the maximum selector 274 being transmitted along lines 276 and 46 to a fan pitch actuator (not shown). The fan pitch actuator may be of the electromechanical type or of any other well-known type which physically adjusts the fan pitch in response to received electrical control signals.

When the fan 28 is operating in a reverse thrust mode, it is desirable to maintain the fan pitch at a fixed angle. A fixed reverse fan pitch demand signal is transmitted along line 278 to a summer 280. Summer 280 also receives the actual fan pitch angle signal along line 282 and compares it with the fixed reverse fan pitch demand signal. The resulting reverse fan pitch error signal is placed on line 284.

A switch 286 operates in response to the engine operator's selecting a reverse thrust mode of fan operation to break the connection between lines 276 and 46 thereby preventing the output signal from the maximum selector 274 from being transmitted to the fan pitch actuator. Instead, switch 286 connects line 284 to line 46, thereby transmitting only the reverse fan pitch error signal from the summer 280 to the fan pitch actuator.

Although it is apparent from the above description that the three individually discussed control loops form an integrated control system, is should be pointed out that each loop constantly interacts with the other two loops. For example, if a change in ambient conditions causes a change in the inlet throat Mach number, the fan exhaust nozzle area is changed to bring the inlet throat Mach number to the reference value. As a consequence of the change in the fan exhaust nozzle area, the fan speed changes, thereby causing the fan pitch to be varied to bring the fan speed back to its rated value. At the same time, the same change in ambient conditions causes the fuel flow to be adjusted in order to maintain the desired thrust under the new ambient conditions.

From the foregoing description it can be seen that the present invention comprises an integrated control system for a gas turbine engine of the turbofan type which provides significant improvements in noise levels, thrust response and operating efficiency. It will be obvious to one skilled in the art that changes may be made to the above-described invention without departing from the broad inventive concepts thereof. For example, interrelated or alternate control loops may be added for controlling other geometry such as compressor stator positions or fan inlet guide vane angles. It is to be understood, therefore, that this invention is not limited to the particular embodiment disclosed, but it is intended to cover all modifications which are within the spirit and scope of this invention as claimed.

What is claimed is:

1. In a gas turbine engine of the turbofan type which includes a wall spaced apart from a core engine to define a bypass duct therebetween, said duct including an inlet and a variable area fan exhaust nozzle, a control system comprising:
   means for generating a signal representative of the actual inlet throat Mach number;
   means for generating an inlet throat Mach number reference signal;
   means for comparing said signals to generate a difference signal;
   actuator means responsive to said difference signal for modifying said fan exhaust nozzle area;
   means for generating a signal representative of the actual engine thrust;
   means for generating a signal representative of the engine power setting;
   means for modifying said power setting signal in response to existing operating conditions to create a thrust demand signal;
   means for comparing said actual thrust signal with said thrust demand signal to generate a thrust difference signal; and
   actuator means responsive to said thrust difference signal for modifying engine fuel flow.

2. The control system of claim 1 and further comprising:
   an inlet throat static pressure sensor; and
   a free stream total pressure sensor;
   wherein said actual inlet throat Mach number signal is generated as a function of signals received from said inlet throat static pressure sensor and from said free stream total pressure sensor.

3. The control system of claim 1 and further comprising:
   means for generating a signal representative of a preselected maximum fan exhaust nozzle area limit; and
   means responsive to said maximum fan exhaust nozzle area limit signal for preventing said fan exhaust nozzle area from exceeding said maximum limit.

4. The control system of claim 3 and further comprising:
   a fan exhaust nozzle area sensor and an engine power setting indicator;
   wherein said means for generating said maximum fan exhaust nozzle area limit signal is responsive to said fan exhaust nozzle area sensor and said engine power setting indicator.

5. The control system of claim 1 and further comprising:
   means for generating a signal representative of a preselected minimum fan exhaust nozzle area limit; and
   means responsive to said minimum fan exhaust nozzle area limit signal for preventing the fan exhaust nozzle area from becoming smaller than said minimum limit.

6. The control system of claim 1 and further comprising:
   means for operating said fan in a reverse thrust mode; and
   means for maintaining said fan exhaust nozzle at a constant area when said fan is operating in the reverse thrust mode.

7. The control system of claim 1 and further comprising:
   sensor means for providing a compressor discharge static pressure sensor signal; and
   sensor means for providing a free stream total pressure sensor signal;
   wherein said means for generating said actual thrust signal is responsive to the ratio of signals received from said compressor discharge static pressure sensor to signals received from said free stream total pressure sensor.

8. The control system of claim 1 and further comprising:
   a fan inlet temperature sensor; and
   a free stream total pressure sensor;
   wherein said means for modifying said power setting signal is responsive to signals received from said fan inlet temperature sensor and said free stream total pressure sensor.

9. The control system of claim 1 and further comprising:
   means for generating a signal representative of a preselected maximum turbine inlet gas temperature limit, and
   means responsive to said maximum turbine inlet gas temperature limit signal for preventing the turbine inlet gas temperature from exceeding said maximum turbine inlet gas temperature limit.

10. The control system of claim 9 and further comprising:
    a compressor discharge temperature sensor;
    a compressor discharge static pressure sensor; and
    a fuel flow sensor;
    wherein said means for preventing the turbine inlet gas temperature from exceeding said maximum turbine inlet gas temperature limit is responsive to signals received from said compressor discharge temperature sensor, said compressor discharge static pressure sensor and said fuel flow sensor to provide a signal representative of the actual turbine inlet temperature.

11. The control system of claim 1 and further comprising:
    means for generating a signal representative of a maximum fan speed limit; and
    means responsive to said maximum fan speed limit signal for preventing the fan speed from exceeding said maximum fan speed limit.

12. The control system of claim 1 and further comprising:
    means for generating a signal representative of a preselected maximum core engine speed limit; and
    means responsive to said maximum core engine speed limit signal for preventing the core engine speed from exceeding said maximum core engine speed limit.

13. The control system of claim 12 wherein said means for generating said maximum core engine speed limit signal is responsive to said engine power setting signal.

14. The control system of claim 1 and further comprising:
   means for generating a signal representative of a preselected core engine minimum idle speed limit; and
   means responsive to said core engine minimum idle speed limit signal for preventing the core engine speed from falling below said core engine minimum idle speed limit.

15. The control system of claim 1 and further comprising:
   sensor means for providing a fan speed sensor signal; and
   means responsive to said fan speed sensor signal for maintaining a constant core engine idle speed when no signal is received from said fan speed sensor.

16. The control system of claim 1 and further comprising:
   sensor means for providing engine vibration sensor signals; and
   means responsive to said engine vibration sensor signal for maintaining a constant core engine idle speed when said engine vibration sensor signals exceed a predetermined limit.

17. The control system of claim 1 and further comprising:
   a variable pitch fan located in said duct between said inlet and said outlet;
   sensor means for providing fan pitch sensor signals;
   means for selectively operating said fan in either a forward or a reverse thrust mode; and
   means responsive to said fan pitch sensor signals for maintaining a constant core engine idle speed if the fan pitch is in a reverse thrust region when a forward thrust mode of fan operation has been selected, or if the fan pitch is in a forward thrust region when a reverse thrust mode of fan operation has been selected.

18. The control system of claim 17 and further comprising:
   means for generating a signal representative of a desired fan speed;
   means for generating a signal representative of the actual fan speed;
   means for comparing said desired fan speed signal with said actual fan speed signal to generate a fan speed difference signal; and
   actuator means responsive to said fan speed difference signal for modifying said fan pitch.

19. The control system of claim 18 and further comprising:
   a fan inlet temperature sensor; and
   a free stream total pressure sensor;
   wherein said means for generating said desired fan speed signal is responsive to said fan inlet temperature sensor and said free stream total pressure sensor.

20. The control system of claim 18 and further comprising:
   means for generating a signal representative of a preselected maximum fan pitch limit; and
   means responsive to said maximum fan pitch limit signal for preventing the fan pitch from exceeding said maximum fan pitch limit.

21. The control system of claim 18 and further comprising:
   means for generating a signal representative of a preselected minimum fan pitch limit; and
   means responsive to said minimum fan pitch limit signal for preventing the fan pitch from falling below said minimum fan pitch limit.

22. The control system of claim 18 and further comprising:
   means for operating said fan in a reverse thrust mode; and
   means for maintaining a constant fan pitch when said fan is operating in the reverse thrust mode.

23. A method of controlling the operation of a gas turbine engine of the turbofan type which includes a wall spaced apart from a core engine to define a bypass duct therebetween, said duct having an inlet and a variable area fan exhaust nozzle comprising the steps of:
   generating a signal representative of the actual inlet throat Mach number;
   generating an inlet Mach number reference signal;
   comparing said signals and generating a difference signal;
   modifying said fan exhaust nozzle area in response to said difference signal;
   generating a signal representative of the actual engine thrust;
   generating a signal representative of the engine power setting;
   modifying said power setting signal in response to existing operating conditions to develop a thrust demand signal;
   comparing said actual thrust signal with said thrust demand signal and generating a thrust difference signal; and
   modifying engine fuel flow in response to said thrust difference signal.

24. The method of claim 23 including the step of generating said actual inlet throat Mach number signal as a function of the inlet throat static pressure and the free stream total pressure.

25. The method of claim 23 including the steps of:
   generating a maximum fan exhaust nozzle area limit; and
   preventing the fan exhaust nozzle area from exceeding said maximum limit.

26. The method of claim 25 including the step of generating said maximum fan exhaust nozzle area limit as a function of the fan exhaust nozzle area and the engine power setting.

27. The method of claim 23 including the steps of:
   generating a minimum fan exhaust nozzle area limit; and
   preventing the fan exhaust nozzle area from becoming smaller than said minimum limit.

28. The method of claim 23 including the steps of:
   operating said fan in a reverse thrust mode; and
   maintaining the fan exhaust nozzle at a constant area when said fan is operating in the reverse thrust mode.

29. The method of claim 23 including a variable pitch fan and further comprising the steps of:
   generating a signal representative of a desired fan speed;
   generating a signal representative of the actual fan speed;
   comparing said actual fan speed signal with said desired fan speed signal and generating a fan speed difference signal; and
   modifying fan pitch in response to said fan speed difference signal.

* * * * *